United States Patent
Shousterman et al.

(10) Patent No.: US 8,452,285 B2
(45) Date of Patent: May 28, 2013

(54) METHOD FOR HANDOVER IN WIRELESS COMMUNICATIONS NETWORK COMPRISING A NUMBER OF SUB-NETWORKS

(75) Inventors: Leonid Shousterman, Herzlia (IL); Oleg Marinchenco, Modein (IL); Mark Altshuler, Ganot Hadar (IL); Vadim Kotchergin, Modiin (IL)

(73) Assignee: SparkMotion Inc., Ottawa (CA)

( * ) Notice: Subject to any disclaimer, the term of this patent is extended or adjusted under 35 U.S.C. 154(b) by 1321 days.

(21) Appl. No.: 11/747,020

(22) Filed: May 10, 2007

(65) Prior Publication Data

US 2008/0279150 A1    Nov. 13, 2008

(51) Int. Cl.
*H04W 36/00* (2009.01)
*H04W 4/00* (2009.01)

(52) U.S. Cl.
USPC ............................... 455/436; 370/331

(58) Field of Classification Search
USPC .................. 455/432.1, 436–448; 370/331
See application file for complete search history.

(56) References Cited

U.S. PATENT DOCUMENTS

| | | | | |
|---|---|---|---|---|
| 6,009,326 | A * | 12/1999 | Roder et al. | 455/436 |
| 6,256,300 | B1 * | 7/2001 | Ahmed et al. | 370/331 |
| 6,317,436 | B1 * | 11/2001 | Young et al. | 370/443 |
| 6,490,259 | B1 * | 12/2002 | Agrawal et al. | 370/331 |
| 2001/0018345 | A1 * | 8/2001 | Longoni et al. | 455/436 |
| 2003/0104814 | A1 | 6/2003 | Gwon et al. | |

FOREIGN PATENT DOCUMENTS

| | | |
|---|---|---|
| EP | 1 942 610 A1 | 7/2008 |
| WO | 01/67798 A1 | 9/2001 |
| WO | 2007/024520 A1 | 3/2007 |
| WO | 2007/049459 A1 | 5/2007 |

* cited by examiner

*Primary Examiner* — Temica M. Beamer
*Assistant Examiner* — Joel Ajayi
(74) *Attorney, Agent, or Firm* — Procopio, Cory, Hargreaves & Savitch LLP

(57) ABSTRACT

The present invention discloses a method for carrying out a handover process in a wireless network, wherein the wireless network comprises at least a first and a second base stations belonging each to a different subnet associated of that wireless network and communicating through a first and a second gateways or foreign agents, respectively, and wherein the first base station is used as a serving base station currently in communication with at least one mobile subscriber station (MS). The method provided comprises a step of determining a traffic conveying entity as an intermediate anchoring point, and when the MS moves to a second subnet which comprises the second base station, a path is established for conveying traffic to/from that MS from/to a remote destination. The path comprises the intermediate anchoring point and the first gateway (or the first foreign agent).

16 Claims, 15 Drawing Sheets

METHOD FOR HANDOVER IN WIRELESS COMMUNICATIONS NETWORK COMPRISING A NUMBER OF SUB-NETWORKS

FIELD OF THE INVENTION

The present invention relates to mobile wireless communications and, in particular, to the improvement of communications of mobile terminals operative in mobile IP based wireless communications networks other than their native networks.

LEGEND

The following are the meanings of certain abbreviations used hereinafter in the description of the invention:

| | |
|---|---|
| ASN- | Access Service Network (e.g. as used by the WiMAX Forum) |
| BS- | Base Station |
| CSN- | Connectivity Service Network (e.g. as used by the WiMAX Forum) |
| DIT- | Data Integrity Tree |
| DPA- | Data Path Anchoring |
| GW- | Gateway |
| HO- | Handover |
| IP- | Internet Protocol |
| MS- | Mobile Subscriber Station (also used as mobile terminal) |
| NAS- | Network Access Server |

BACKGROUND OF THE INVENTION

Mobile units, e.g. telephones, laptop computers, etc. are known to be able to roam in wireless networks between various locations. Still, while roaming through various networks and sub-networks they need to maintain their connectivity. Various aspects relating to this mode of operation were suggested by the IETF ("Internet Engineering Task Force") and are described in a series of RFC (Request for Comment) documents.

As will be appreciated by those skilled in the art, one of the problems characterizing mobile networks is, that mobile nodes may replace rather frequently their respective traffic attachment points (as they are typically associated with the corresponding NAS) in the access network. This problem is more common for distributed networks, in which the network access server (NAS) may reside in any of the base stations associated with a specific network.

Various ways of overcoming this problem have been offered in the past For example our applications U.S. Ser. No. 11/175,384 (now U.S. Pat. No. 7,881,262) and Ser. No. 11/362,372 (now U.S. Pat. No. 7,561,692). The first describes a method for providing secured mobile IP services by creating a virtual anchored node at an ASN associated with the mobile terminal and with a logical NAS, and where the anchored node communicates when required with other elements associated with that ASN. U.S. Ser. No. 11/362,372 discloses a method for authenticating a mobile terminal by transmitting a request for authenticating the mobile terminal; receiving the request at a base station associated with the network at which the mobile terminal is operative; and selecting an entity that can operate as a single authentication access entity for that mobile terminal.

All acceptable solutions for mobile networking involve hiding the user mobility from the mobility unaware part of the network. Such hiding may be achieved for example by anchoring the mobile user's data path at a certain node within the mobility aware part of the network. The part of the data path between the anchor node and the mobile user's peer never changes due to the user's terminal mobility. This "Anchor Node" is typically referred to as Home Agent in Mobile IP networks and 3GPP2, GGSN in 3GPP networks.

However, it has later been recognized that mobile networking solutions should preferably include additional hierarchies of the data path anchoring. Mainly, because it is often desired not to overload the network with data related to terminal mobility within the access network (micro-mobility) form the remaining part of the mobile aware network. This may again be achieved by anchoring the data path within the access network in addition to the anchoring discussed above in the core mobile network. This type of solution is available in 3GPP, 3GGP2 and WiMAX_NWG architectures. In order to implement these solutions localized mobility management has also been addressed in the art such as in drafts of the *Network-based Localized Mobility Management IETF Working Group*, presented at http://www.ietf.org/html.charters/netlmm-charter.html.

Thus the data path anchoring described becomes hierarchical, consisting of one anchor point in the access network and one anchor point in the core network. This model has been further extended to allow more than two levels of hierarchy along the data path. Consequently, WiMAX NWG architecture allows having hierarchical data path where multiple ASN GWs serve as intermediate anchor points on the mobile user's data path extending between the serving BS and the anchor ASN GW/Foreign Agent.

Similarly, hierarchical MIPv4 is described in *Mobile IPv4 Regional Registration Mobile IP Working Group Internet Draft*, by Eva Gustafsson (Ericsson), Annika Jonsson (Ericsson), Charles E. Perkins (Nokia Research Center), which describes one additional level of hierarchy beneath the Gateway Foreign Agent ("GFA").

The idea of having multi-level mobile data path hierarchies is now being recognized as a useful idea as it allows flexibility in localizing mobility within parts of mobile networks.

Still, the dilemma associated with hierarchical data path management, i.e. direct vis hierarchical data path for WiMAX NWG architecture is illustrated in FIG. 2. As may be seen from that Fig., the data path for an MS may be established either directly between the BS and ASN GW1 or alternatively through an intermediate anchor in ASN GW2. In general a hierarchical data path is considered to be a suboptimal solution from the routing perspective. However if the ASN IP Routing Segment 1 has much higher capacity than the ASN IP Routing Segment 2, it would be advisable to have an intermediate anchor in the ASN GW2, because in this case, the lower capacity routing segment will not have to accommodate transmission overheads associated with supporting handovers (as long as the mobile user moves between the base stations connected to the higher capacity routing segment).

In addition, US 2004063429 describes a configuration which comprises a number of routers and a gateway device connected above edge routers in order to provide in respective base stations a hierarchical structure and configured to perform relaying of data to the base stations, where the underlying idea of this publication is to make it feasible to readily decrease the handover transaction time.

However, the main unsolved problem associated with all the solutions discussed above, is, how to effectively manage such hierarchical data paths.

SUMMARY OF THE INVENTION

It is therefore an object of the present invention to provide a method and apparatus that allow the formation and use of generic mechanism to manage hierarchical data paths in a form of data path anchoring (to be called hereinafter "DPA" and/or "DIT") Tables. In simple networks the DPA and/or DIT Tables may be provisioned and managed manually while in complex networks the DPA and/or DIT Tables might be created and managed automatically utilizing the information delivered through the use of routing protocols.

It is another object of the present invention to provide a method and device that enable utilizing topology information and traffic engineering metrics of known routing protocols, to establish required management without affecting the operation of already existing routers.

It is still another object of the present invention to enable creating advanced ASN architectures.

Other objects of the invention will become apparent as the description of the invention proceeds.

According to a first embodiment of the invention, there is provided a method for carrying out a handover process in a wireless network which comprises at least a first and a second base stations belonging to at least two different subnets of said wireless network and communicating through a first and a second gateways or foreign agents, respectively, and wherein the first base station is currently serving as a base station that is in communication with at least one mobile subscriber station (MS). The method comprises a step of determining a traffic conveying entity as an intermediate anchoring point, and characterized in that when the MS moves to a second subnet comprising the second base station, a path is established for conveying traffic to/from that MS from/to a remote destination, which path comprises the intermediate anchoring point and the first gateway and/or the first foreign agent.

Preferably, each of the at least two subnets is operative at a rate higher than the rate of at least one link along a path connecting the at least two different subnets.

By another preferred embodiment, the method provided further comprising a step of forwarding topology related information and/or capacity information towards routers and/or gateways located at the wireless network.

In accordance with yet another embodiment of the invention, the method further comprising a step of providing at least one traffic path anchoring table which comprises IP addresses of entities eligible to be used as intermediate anchoring point for the path to be established.

According to another aspect of the present invention, there is provided a wireless system comprising at least two subsystems, each comprising at least one base station communicating through a gateway and/or foreign agent, and wherein the wireless system is adapted to determine a traffic conveying entity as an intermediate anchoring point for conveying traffic from/to a mobile station (MS) communicating with one of the base stations, and in case the mobile terminal moves to one of the other at least two subsystems, the system is operative to establish a communication path for conveying traffic to/from that MS from/to a remote destination, which path comprises the intermediate anchoring point and the gateway and/or the foreign agent.

By still another embodiment, each of the at least two subsystems is operative at a rate higher than the rate of at least one link extending along a path connecting the at least two subsystems.

Preferably, the system provided further comprises means for forwarding topology related information and/or capacity information towards at least one gateway and/or towards at least one gateway comprised in the system.

In accordance with yet another embodiment, the system further comprising means for providing at least one traffic path anchoring table which comprises IP addresses of entities eligible to be used as intermediate anchoring point for said path to be established.

DETAILED DESCRIPTION OF PREFERRED EMBODIMENTS

A better understanding of the present invention is obtained when the following non-limiting detailed description is considered in conjunction with the following drawings.

Figure 1:
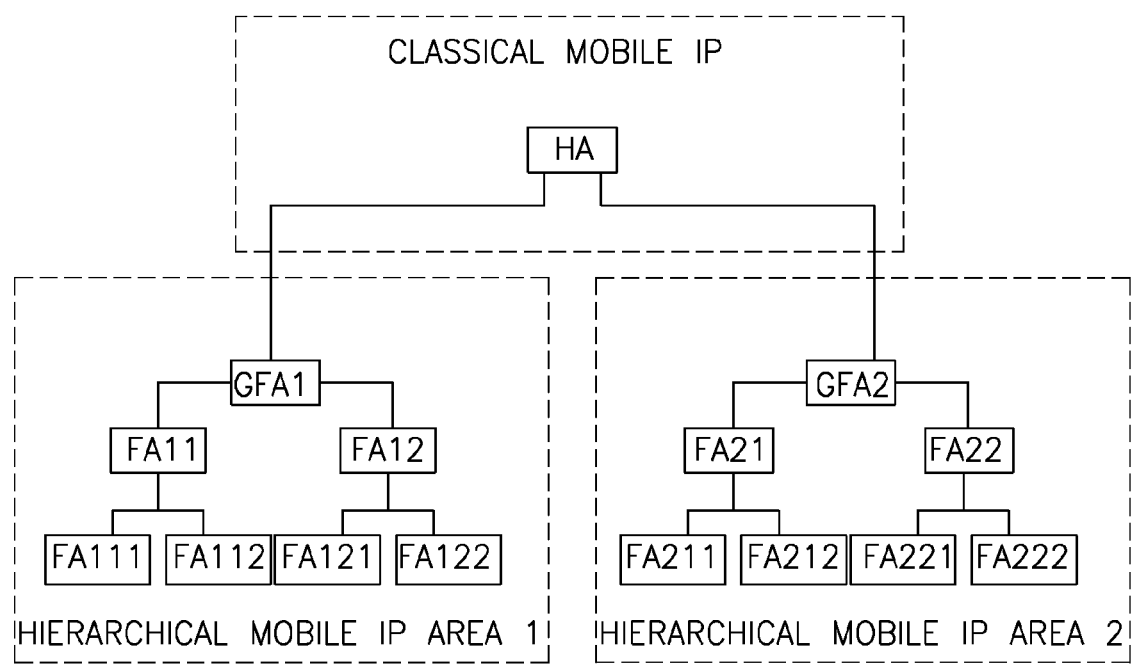
FIG. 1 illustrates a schematic example of a prior art Hierarchical Mobile IP network.
Figure 2A:
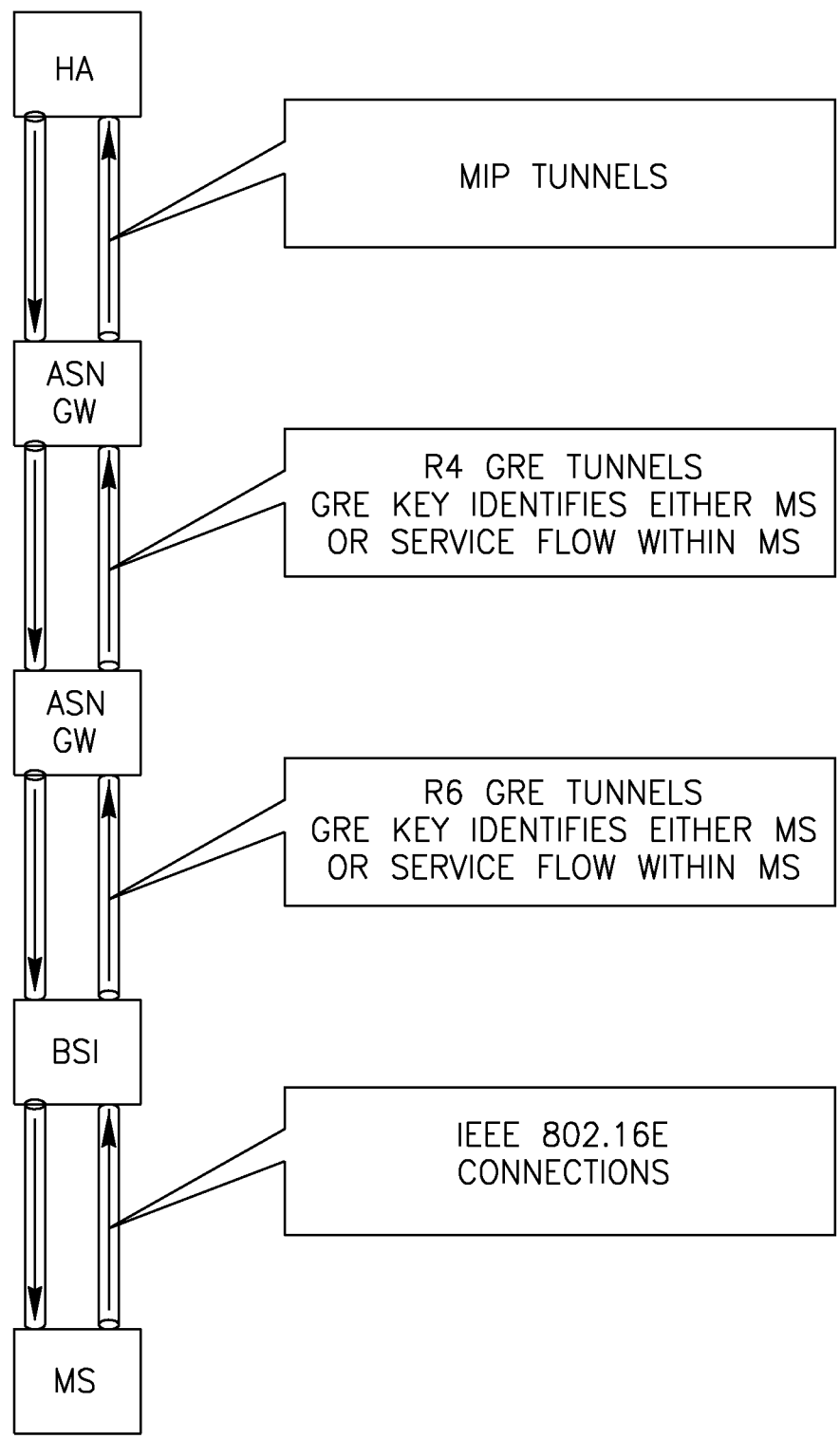
FIG. 2A shows a typical WiMAX Data Path Architecture.
Figure 2B:
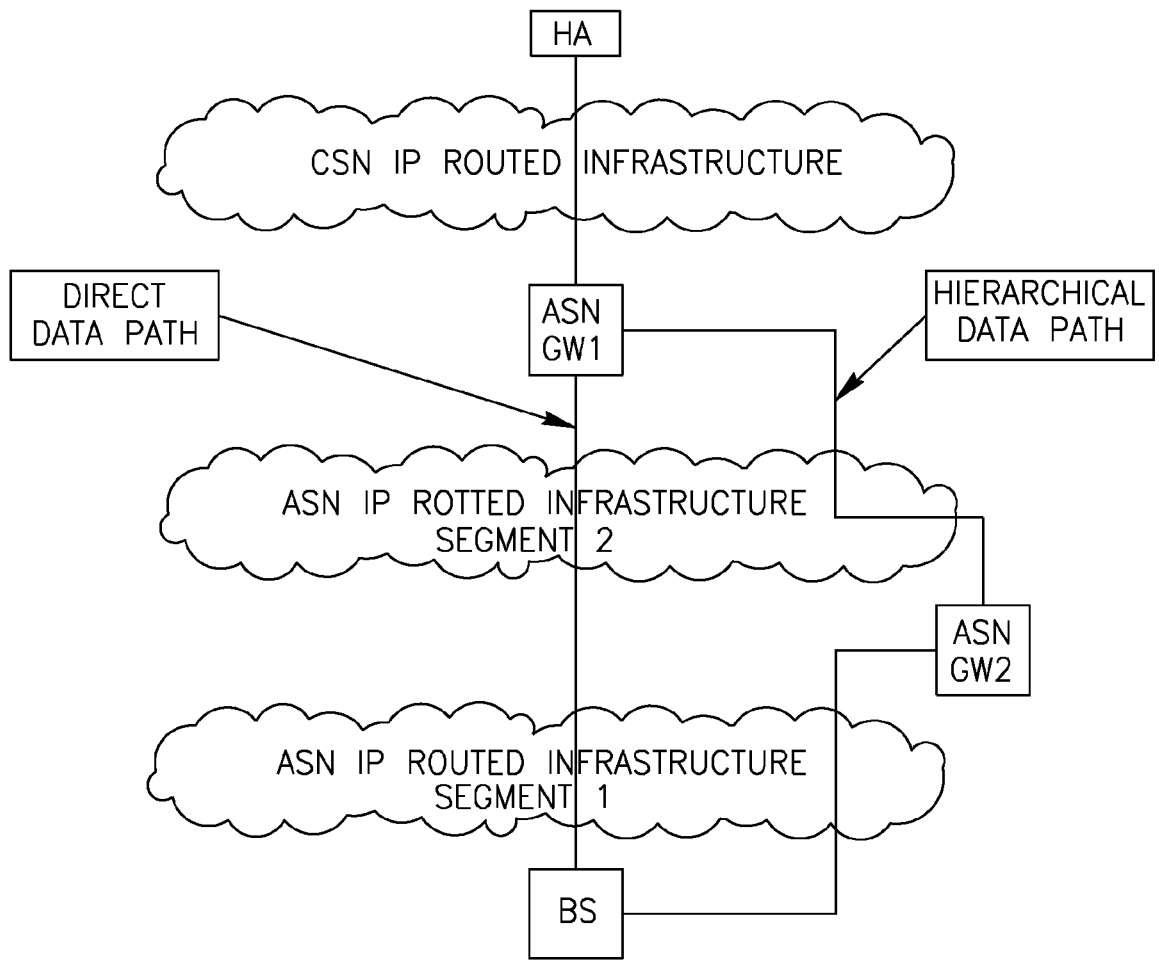
FIG. 2B demonstrates an option of direct vis hierarchical data path used in a WiMAX NWG architecture.

WiMAX NWG Architecture and Data Path Control Protocol:

Let us consider a case of implementing a method according a preferred embodiment of the present invention in WiMAX NWG environment. The entities typically involved in maintaining a user's data path in the WiMAX NWG Architecture are shown in FIGS. 2A and 2B. Reverse tunneling is required for R6 and R4 tunnels and should preferably be employed for MIP tunnels extending between the Anchor GW/FA and HA, in order to enforce traffic passing through the provider's network. At R6 and R4 reference points, the data paths can be managed by using Data Path Control Protocol, modeled in accordance with Mobile IP and 3GPP2 A10/A11.

Figure 3:
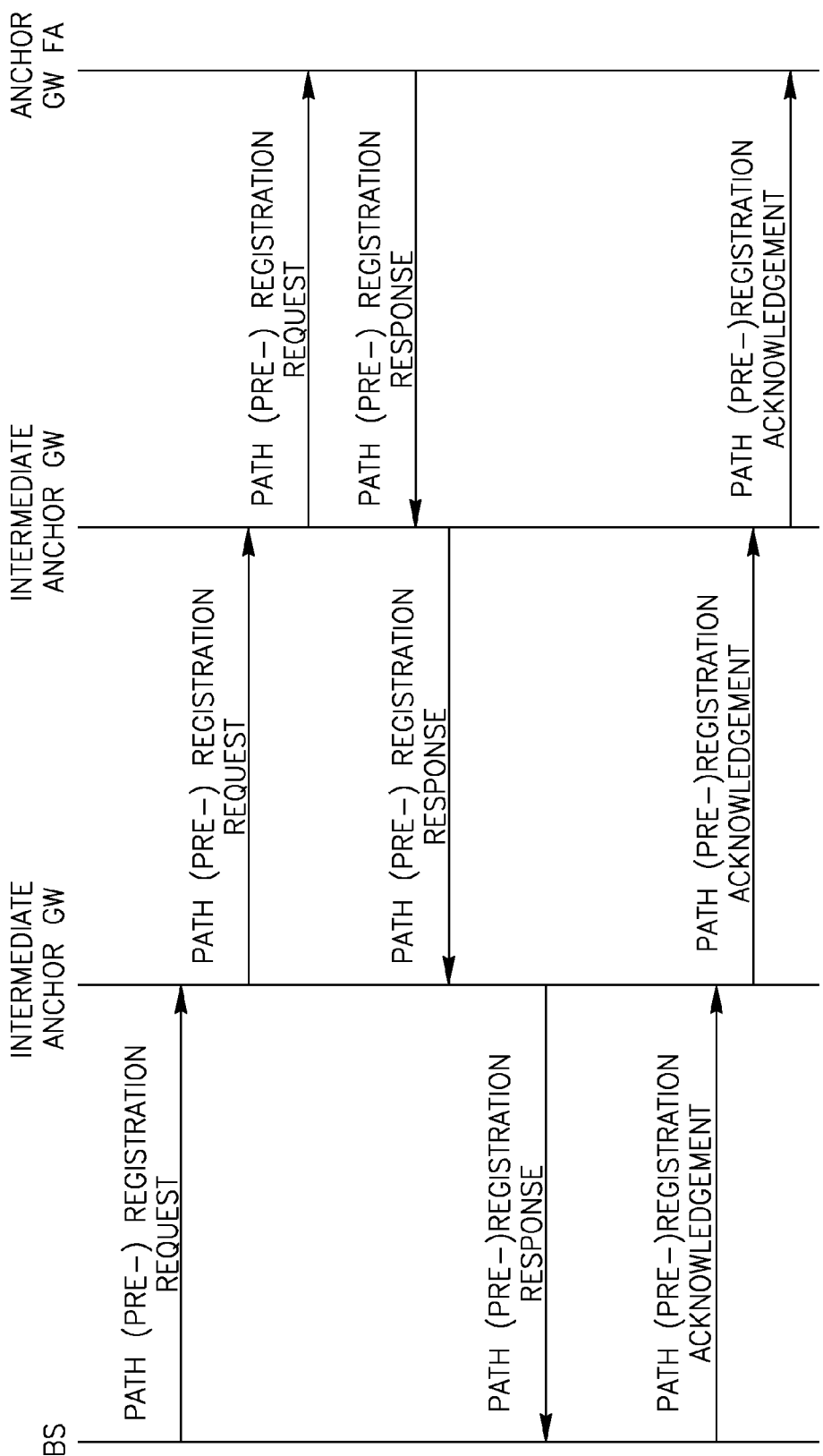
FIG. 3 demonstrates the steps in Data Path Establishment in WiMAX NWG ASN (BS to Anchor GW/FA)
Figure 4:
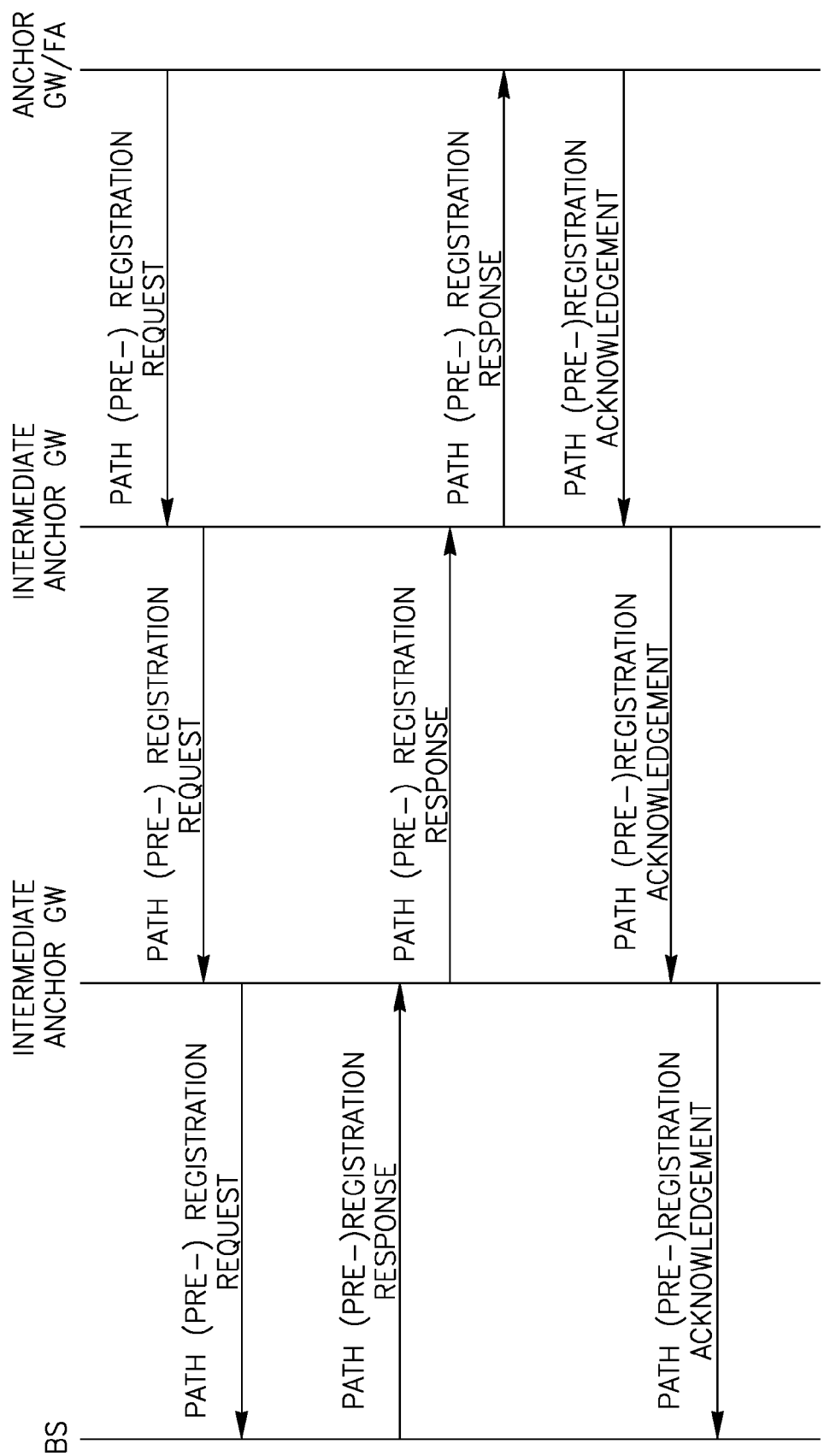
FIG. 4 demonstrates the steps in Data Path Establishment in WiMAX NWG ASN (Anchor GW/FA to BS)

The data path is established via three-way handshake, namely, Path (Pre-) Registration Request, Path (Pre-) Registration Response, Path (Pre-) Registration Acknowledgement) between the end points of each segment of the data path (as shown in FIGS. 3 and 4).

The data path is established between the base station that serves the MS and the ASN GW that acts as anchor GW/FA for that MS and may comprise an arbitrary number of intermediate Anchor GWs located along the data path between the BS and the Anchor GW/FA.

The payload associated with the Path (Pre-) Registration Request contains the identifier of the final destination end point of the data path. The identifier is either an IP Address or can be translated into an IP Address. If Path (Pre-) Registration Request is sent from the BS to the Anchor GW/FA as shown in FIG. 3 and is the identifier of the Anchor GW/FA. If Path (Pre-) Registration Request is sent from the Anchor GW/FA to the BS as illustrated in FIG. 4, it will be the identifier of the BS.

Pre-Registration of the data path is used during handovers in order to allow traffic distribution to the entire set of the Target BSs. The traffic is multicast only for the duration of the handover process and only for specific service flows.

Data Path Anchoring Tables

For managing data path hierarchies according to an embodiment of the present invention, Data Path Anchoring Tables (DPA Tables) are maintained in the Base Stations and ASN GWs of an ASN.

When a data path instigating entity (i.e. ASN GW or Base Station) needs to establish a data path, it starts by searching the DPA Table for the IP address of the final destination end point of the data path. By a preferred search algorithm the longest prefix would be declared as a match. Once the IP address matches one of the table entries, the list of the IP addresses of potential Next Anchor Points is retrieved. If the list is empty then (Pre-) Registration Request is sent directly to the final destination end point. Otherwise, the Request is sent to one of the Next Anchor Points. Selection of a preferable Next Anchor Point is policy based. It should be noted that separate lists for uplink and downlink directions could sometimes be a preferred implementation of this embodiment, where uplink direction means that the Path (Pre-) Registration Request propagates from the BS towards the Anchor GW/FA (as illustrated in FIG. 3), whereas downlink direction means that Path (Pre-) Registration Request propagates from the Anchor GW/FA to the BS (as illustrated in FIG. 4).

When an ASN GW, selected as an intermediate data path anchor point, receives a Path (Pre-) Registration Request, it executes the same procedure as described above, and similarly at every other intermediate data path anchor point until the Request is delivered to the final destination end point of the data path.

An example of a DPA Table is shown hereinafter, and corresponding to the ASN GWs presented in FIG. 5.

TABLE 1

Example of Data Path Anchoring Table

| Destination Address Block | Direction | List of Next Anchor Points Available |
|---|---|---|
| 10.50.60.16/28 | Downlink | 10.50.60.21, 10.50.60.22 |
|  | Uplink | Direct (empty list) |
| Default | Both | Direct (empty list) |

The term "direct" used to describe the list of next anchor point available in the uplink direction, refers to Data Path Registration that should be executed directly with the node identified by the destination IP address, whereas the term "Default" used in the table to denote any other IP address.

A group of Base Stations and ASN GWs that can establish direct data paths between each other is considered to constitute a Direct Data Path Domain. An example of Direct Data Path Domains is illustrated in FIG. 5.

Figure 5:
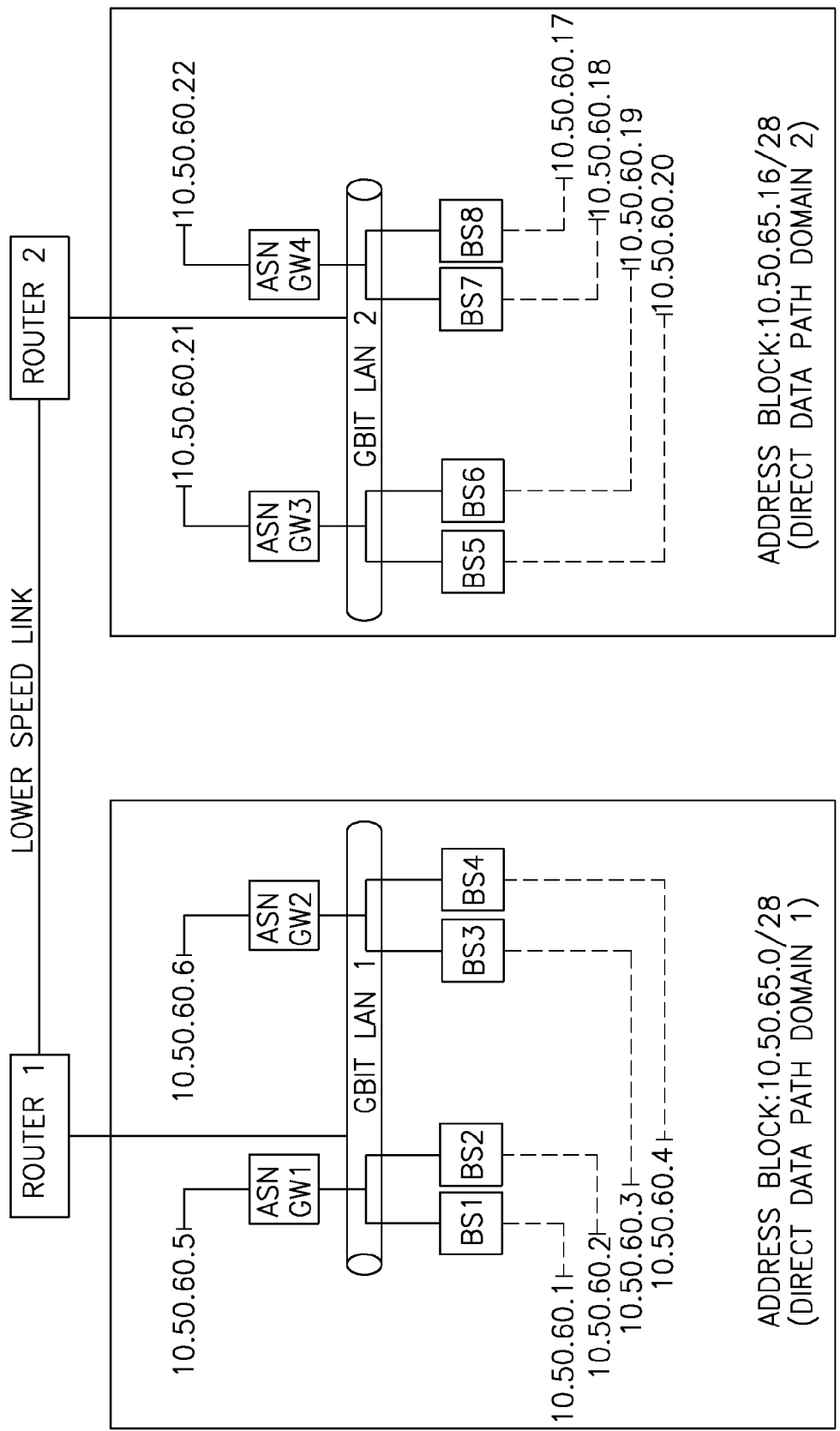
FIG. 5 illustrates an example of Direct Data Path Domains.

Let us now assume that a Mobile Station (MS) initially enters the network in BS1 (FIG. 5). Typically, the data path will be locally anchored in either ASN GW1 or ASN GW2 in order to hide the mobility of the MS as long as it moves between the Base Stations interconnected by the LAN1.

Figure 6:
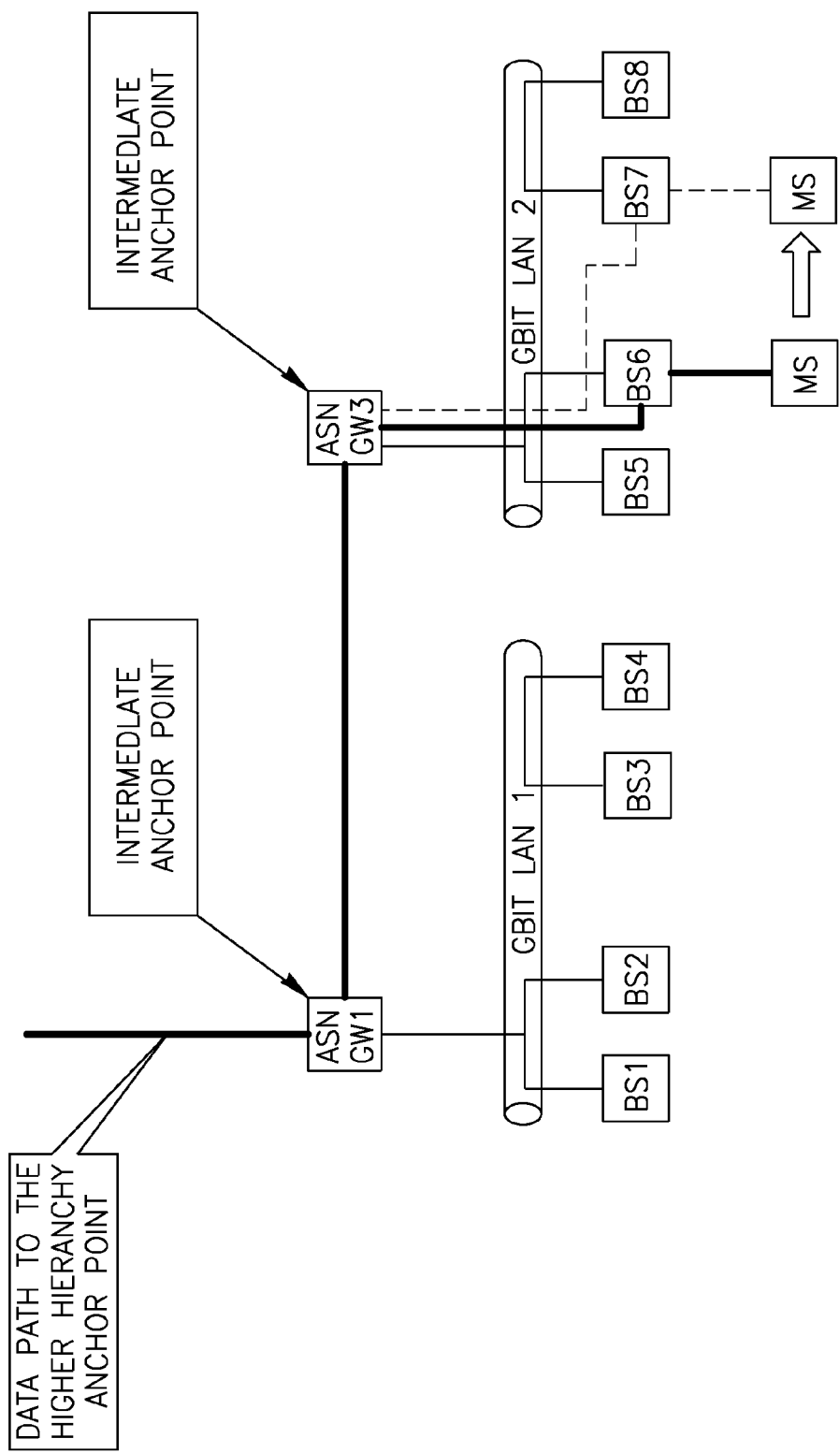
FIG. 6 presents a data path anchoring process (for the ASN architecture shown in FIG. 2)

However, this situation changes when a hand over process is carried out when the MS moves from BS4 to BS5 (or from any BS connected to LAN1 to any BS connected to LAN2). Typically, the Data Path for the MS anchored is kept in ASN GW1, because updating the data path to the higher hierarchy anchor point may be subjected to longer traffic interruption times. However, according to the present invention, if the MS remains within the area covered by BS5 through BS8 it would be preferred not to involve ASN GW1 in the handover process. Successful handover preferably requires low latency communication and high capacity links between the anchor point and the Target BSs, because smooth handover may involve multicasting data from the Anchor GW to the entire set of the TBSs. The resulting data path hierarchy is shown in FIG. 6.

Data Path Anchoring Policies:

One example of a policy how to designate an intermediate anchor point has already been discussed above. If there is a region where handovers are more frequent than in general and the routing or switching infrastructure provides for capacity sufficient to accommodate overheads associated with smooth handovers, it would be desirable to localize mobility within that region by creating an intermediate anchor point in one of the ASN GWs located in that region.

Now, let us consider an example of a policy for selecting the ASN GW that can function as a FA in accordance with an embodiment of the present invention. Data path may be regarded as a form of routing enforcement and as such is, generally speaking, less optimal than natural routing path. Thus it would be desirable to construct the data path as close to the natural routing path as possible.

Since ASN and CSN usually belong to different operators, they are likely to be separate autonomous systems interconnected via a limited number of Border Gateways (BGP Gateways). The topologically closer an ASN GW is located to a Border Gateway, the more suitable the former is to function as FA, because the data path then becomes closer to the natural routing path.

Figure 7:
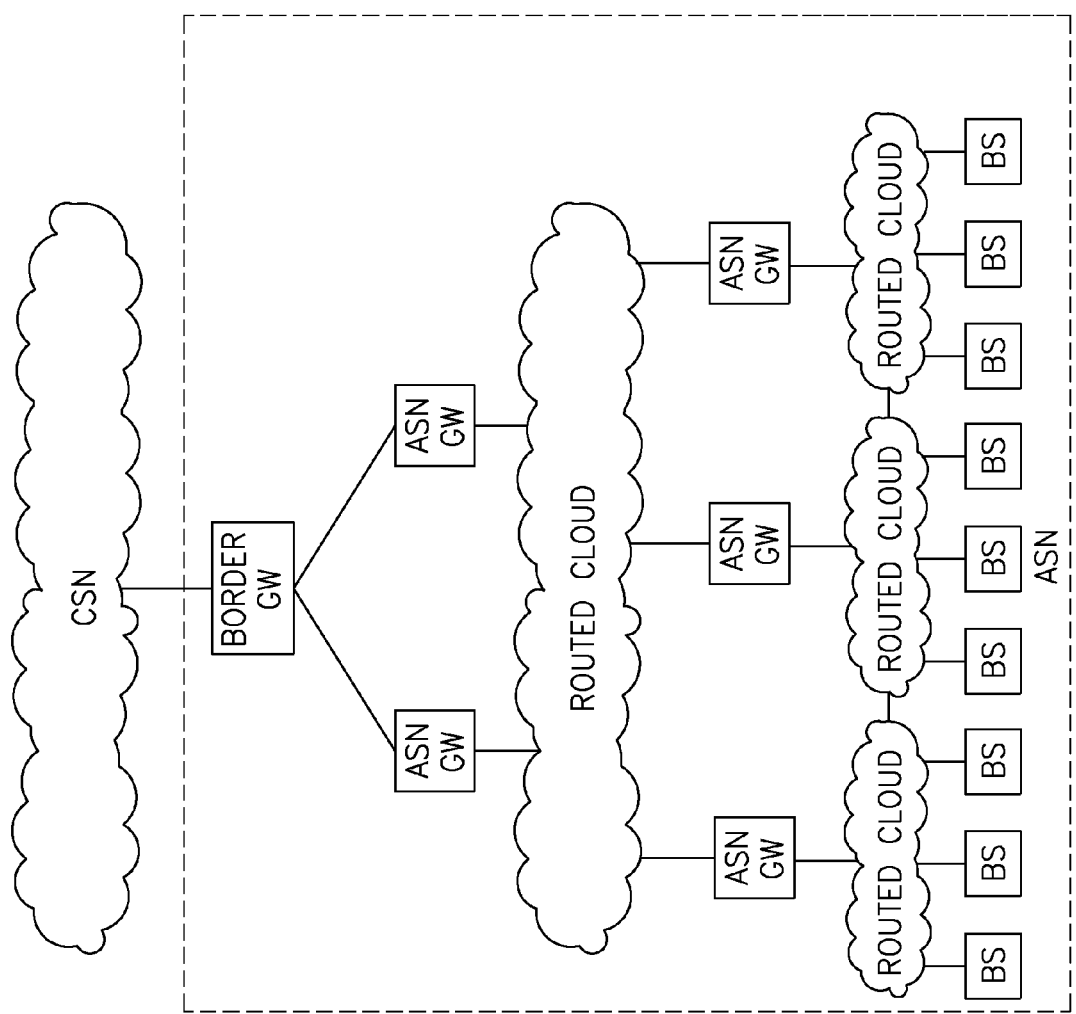
FIG. 7 illustrates examples of data path anchoring policies.

The policies discussed above are illustrated in FIG. 7, but as will be appreciated by those skilled in the art, there could be of course other policies that may create additional intermediate anchor points along the data path.

It should be noted that creating an intermediate anchor point, although brings benefits associated with localizing mobility, makes the data path even less optimal from the routing perspective. Thus there is likely to be a tradeoff associated with hierarchical data path anchoring. Good policy for hierarchical routing should take into account the network topology and capacity available in various parts of the network.

Creating and Managing DPA Tables

Figure 8:
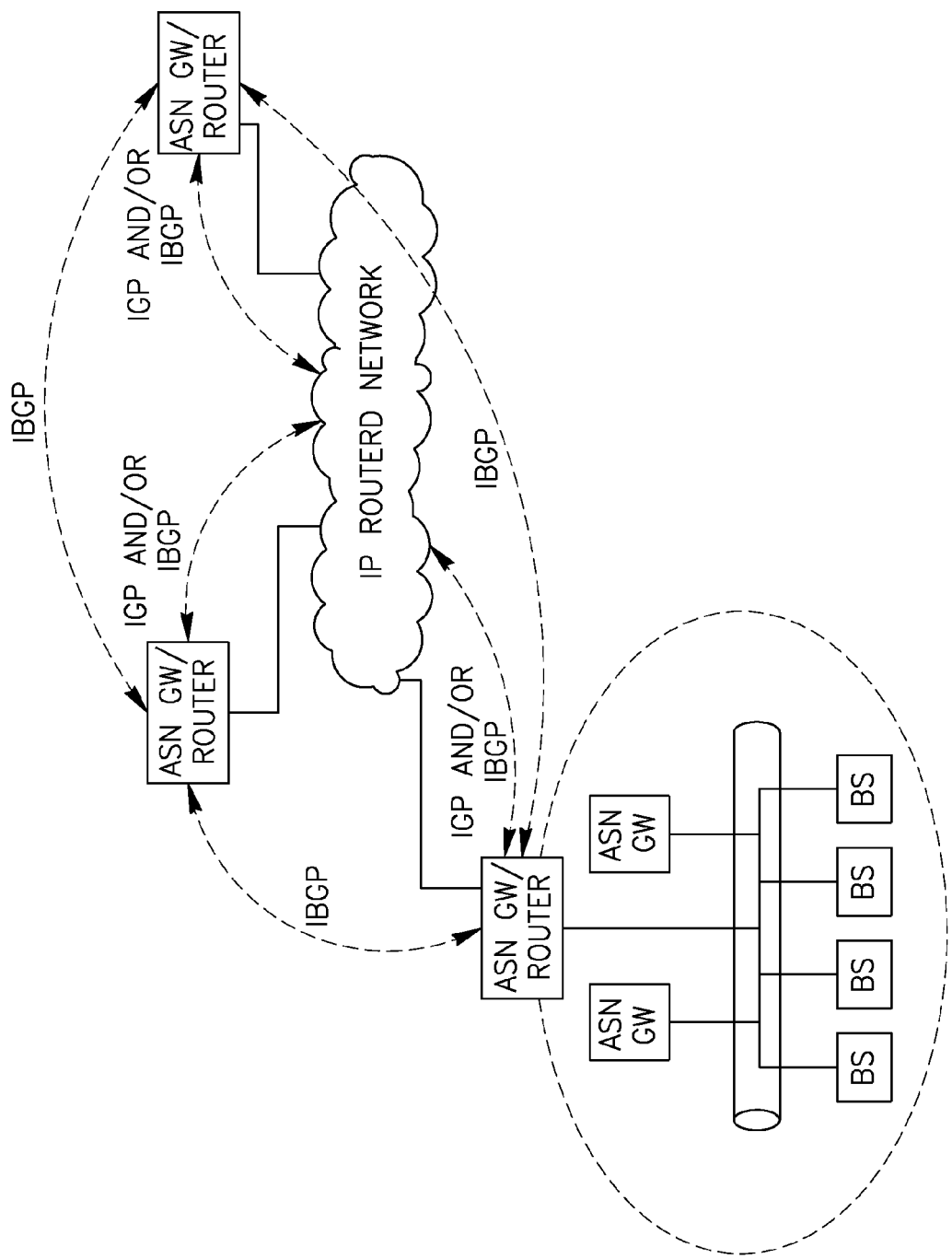
FIG. 8 exemplifies an embodiment of the present invention for distributing topology information and TE metrics.

In small networks, the DPA Tables might be manually provisioned and managed, but in large networks (e.g. as presented in FIG. 8) manual management is not feasible so that automatic means should be employed. In the IP routed networks the topology information will be distributed among the routers by routing protocols. Link state protocols, such as OSPFv2 (RFC 2328) and IS-IS (RFC 1195) will require that every router keep the picture of the complete network topology thereat.

The same protocols also may distribute Traffic Engineering Metrics that supply information about capacity available in the network. For example Traffic Engineering Metrics standardized for OSPFv2 (RFC 3630) include such metrics as link maximum bandwidth, link maximum reservable bandwidth, link unreserved bandwidth. Identical metrics have been standardized for IS-IS (RFC 3784).

Thus, according to an embodiment of the invention routing protocols may be used in order to distribute the relevant topology and capacity information. In order achieve that, at least some ASN GWs should have routers' capabilities. If ASN GWs are routers, they can participate in the routing protocols and thus learn the information necessary for implementing good data path anchoring policies.

Modern Interior Gateway Protocols, such as OSPFv2 and IS-IS are extensible and allow adding new, not necessarily routing related, informational elements. These protocols may also be used in order to allow the ASN GW to learn about each other.

In accordance with another embodiment of the invention, and in addition to supporting Interior Gateway Protocols (IGPs), the ASN GWs that are routers may support Internal Border Gateway Protocol (IBGP) as defined in RFC 4271. Internal Border Gateway Protocol is TCP based and runs over TCP connections established between the routers that participate in the protocol. Since the protocol is a peer-to-peer protocol it allows communicating information that is meaningful only for the participating peers. Thus it provides the ASN GWs with means to negotiate data path anchoring policies in addition to distributing routing policies.

On the other hand, it is rather unlikely that all ASN GWs will be also routers. Furthermore, the data path anchoring policies must also be executed in Base Stations, being entities which are very unlikely to function as routers as well. Therefore there is a need for a lightweight protocol that will convey the necessary information from the ASN GWs that are routers to other ASN GWs and Base Stations (non-router entities) within a given subnet. Such an arrangement requires only one ASN GW in a subnet to be a router. Examples for such a protocol could be UDP or ICMP based and may use layer 2 broadcasts to deliver the necessary information to the receivers.

Updating Hierarchical Data Paths

Figure 9:
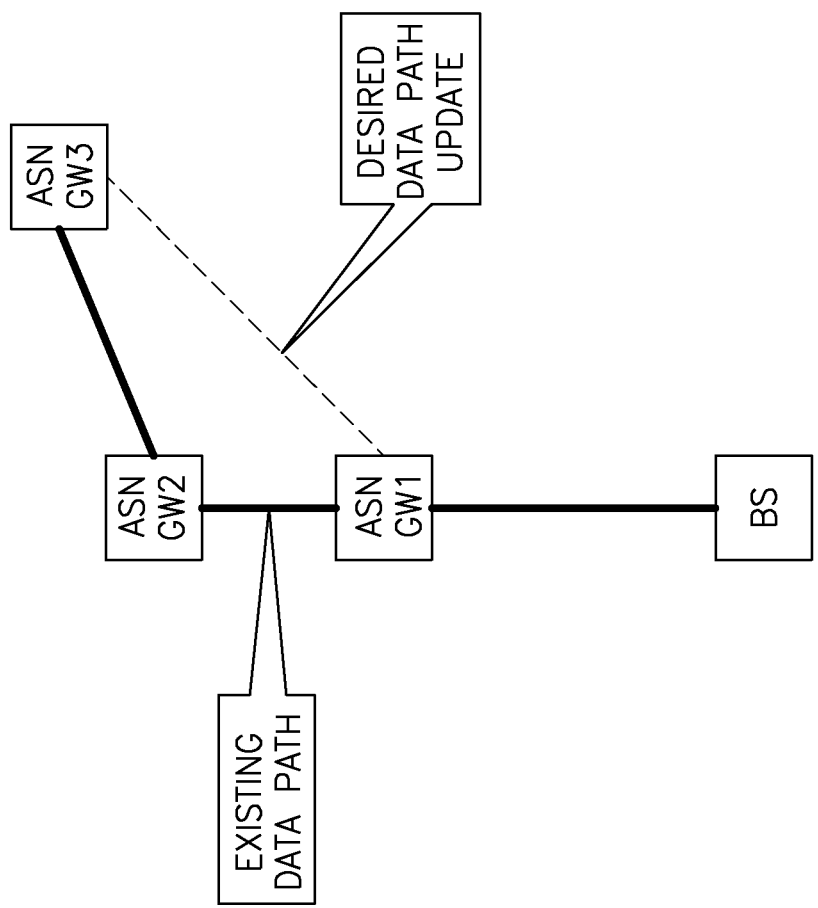
FIG. 9 illustrates an example of a data path update.

The desired data path hierarchy may be calculated in each BS and each ASN GW based on the topology information delivered in the routing protocols. Thus when topology changes, the desired data path hierarchy may also change. The situation is illustrated in FIG. 9, where the data path should be established directly between the ASN GW1 and the ASN GW3 while the ASN GW2 is to be removed from the data path.

Since a number of network entities may simultaneously detect the desired topology change, it is required to synchronize the data path update. Preferably, the BS will be the node that synchronizes the data path updates. The reason is that independently of network topology changes, the BS can also instigate data path change due to handovers. For this purpose we introduce here a new primitive—Path Redirect Notification. When one of the Data path end points (e.g. the Anchor GW/FA or any Intermediate Anchor GW, or the BS) detects a need to update the data path it would send a notification (e.g. a request) for path redirecting. Preferably, the "request for redirection" is sent to the Anchor GW/FA, which in turn initiates the procedure for path correction, and when the Path Redirect Notification reaches the BS, it instigates Path Registration in order to update data path.

Figure 10:
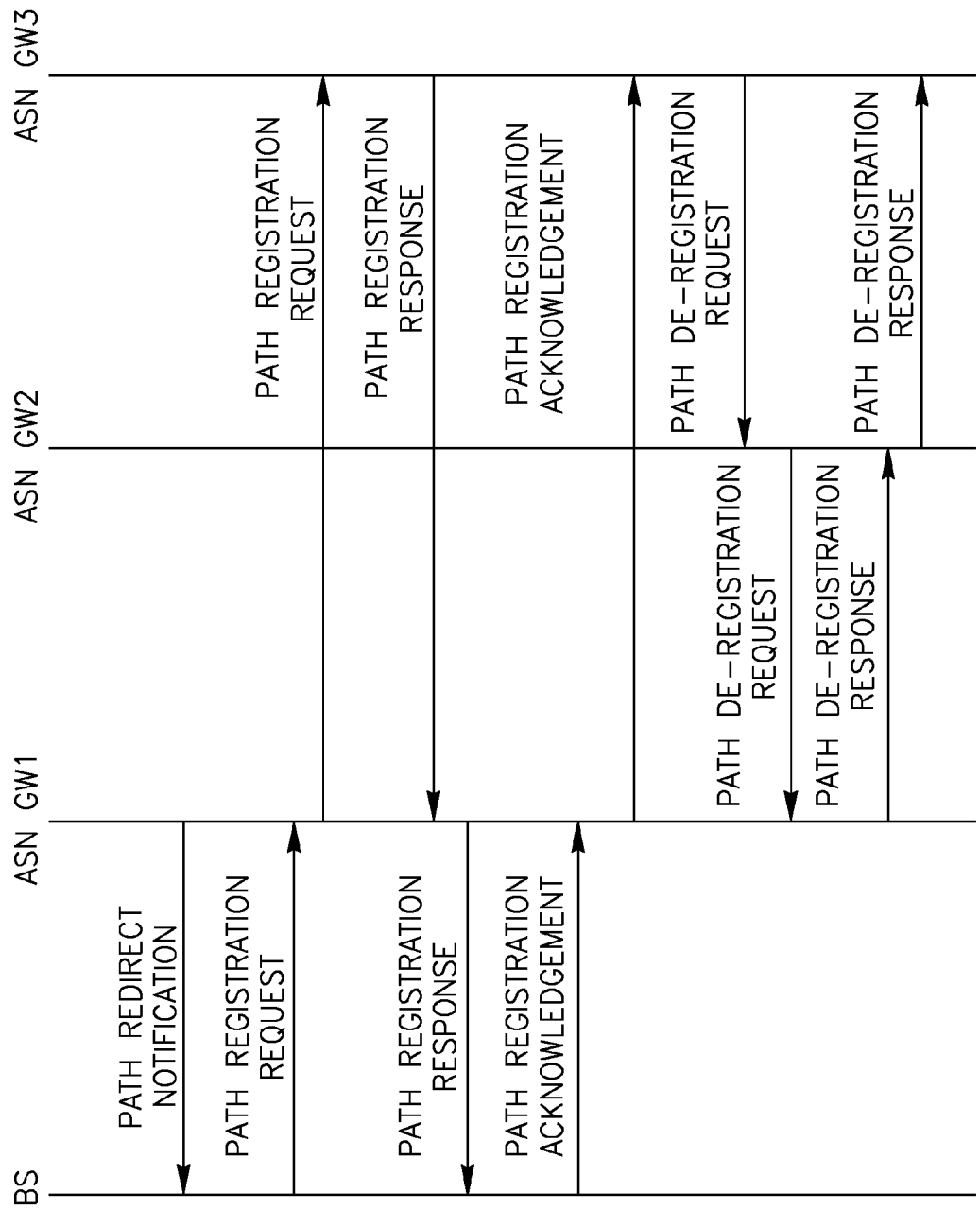
FIG. 10 illustrates schematically a process according an embodiment of the present invention for updating a data path.

A schematic illustration of this process is shown in FIG. 10, where in the example shown ASN GW1 was the first to learn about the topology change.

Data Integrity Trees and DIT Tables

As it has been mentioned while discussing the data path anchoring policies that one of the major motivations for creating hierarchical data paths and localizing mobility is to accommodate overheads associated with supporting smooth handovers. In order to achieve smooth handover the data traffic should preferably be distributed to the entire set of the Target Base Stations. Two methods of distributing are considered herein: the first—multicasting which has the drawback of consuming network capacity, and the second—buffering at the anchor points and delivery on demand, which has the drawback that it requires low latency.

Let us consider the network exemplified schematically in FIG. 5. As long as the MS moves within a Direct Data Path Domain, the intermediate anchor point in the domain takes care after the distribution of traffic between the Target BSs. Now, let us assume that the MS moves from BS4 to BS5 and that the neighbors of BS4 are BS3, BS5 and BS6. Under this assumption, the Data Integrity Tree may look like the example shown in FIG. 11. One should note that in order to minimize the utilization of the lower capacity link between LAN1 and LAN2, BS5 and BS6 should select the same ASN GW as their preferable intermediate anchor point. Had they selected different ASN GWs, the utilization of the lower capacity link would have been doubled.

Figure 12:
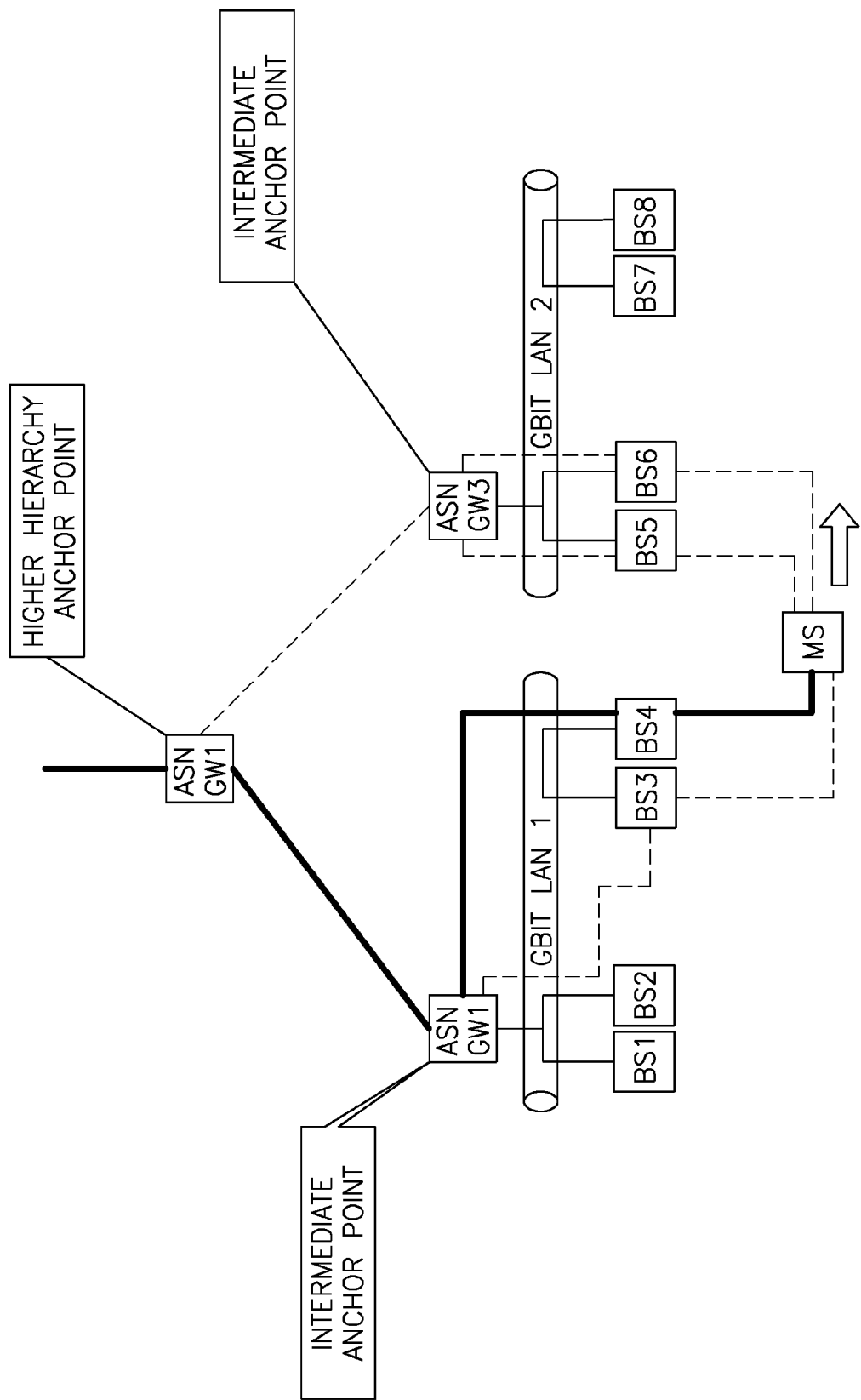
FIG. 12 illustrates an example of example of data integrity tree.

If the next hierarchy the anchor point is connected to LAN1 and LAN2 with link of capacity higher than that of the link that interconnects the LANs the preferable Data Integrity Tree may look as it demonstrated in FIG. 12. Again BS5 and BS6 should preferably select the same ASN GW as their preferred intermediate anchor point.

In fact, the task of building Data Integrity Trees may be considered to be analogous to the task of building IP Multicast Routing Trees. The Anchor GW/FA is analogous to Multicast Routing Tree Root and the Serving BS IP address represents not only the Serving BS but also the entire set of the neighbors, thus the Serving BS IP address may be used as a group address.

The Data Integrity Tree Tables (DIT Tables) may be constructed using the following format:

TABLE 2

Example of DIT Table

| DIT Group: {Anchor GW/FA ID, Serving BS IP Address} | Next Anchor Point |
|---|---|
| {10.120.85.10, 10.50.60.4} | 10.50.60.21 |

Figure 11:
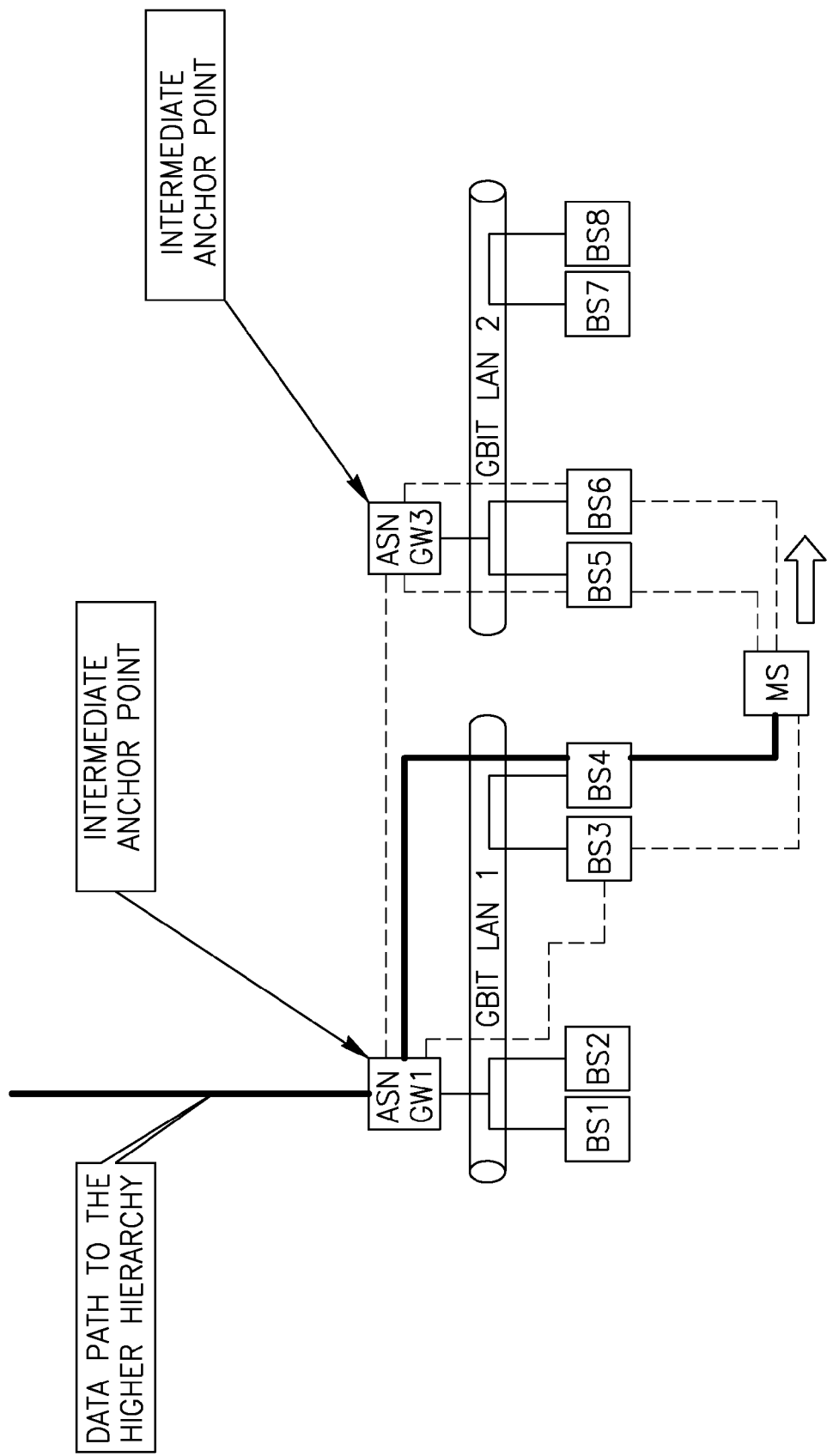
FIG. 11 illustrates a data integrity tree (DIT) construed in accordance with the present invention.
Figure 13:
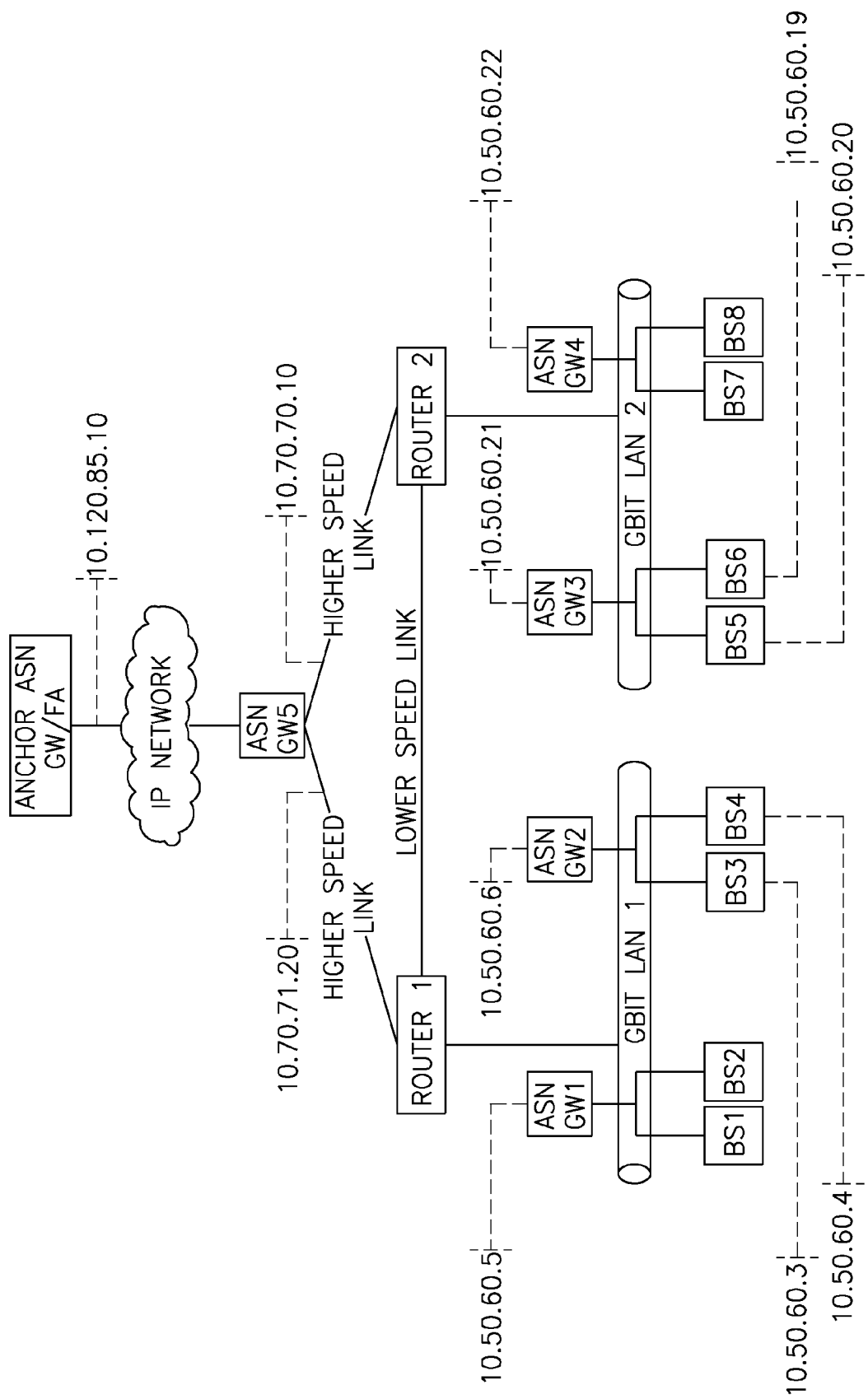
FIG. 13 demonstrates an example of hierarchical network topology.

The DIT Table presented in Table 2 could be adequate for BS5 and BS6 of FIG. 11, FIG. 12 and FIG. 13. The assignment of the IP Addresses is shown in FIG. 13.

As will be appreciated by those skilled in the art, each entry in a DIT Table should preferably point only to one Next Anchor Point because all the Neighbor BSs must select the same ASN GW and their intermediate anchor point.

The Target BSs may select different intermediate anchor points for different MSs. However having individual DIT Table entry for each MS is preferably not scalable. In order to overcome this problem the MSs are distributed into a small number of groups, while keeping an individual DIT Table entry for each group.

In order to divide the MSs into a number of groups, a hash function is used in accordance with an embodiment of the present invention for calculating a small (e.g. 4-bit) pseudo-random number out of 48-bit MSID (referred hereinafter as "MSID Hash"). Various algorithms might be used for such hashing, although a straightforward approach of taking the less significant bits of the MSID should well suit this purpose. The algorithm for MSID hashing should preferably be the same in all BSs and ASN GWs participating in building the same Data Integrity Trees.

Thus the DIT Table may be further enhanced as follows:

TABLE 3

Example of Enhanced DIT Table

| DIT Group: {Anchor GW/FA IP Addresses, Serving BS IP Address, MSID Hash} | Next Anchor Point |
|---|---|
| {10.120.85.10, 10.50.60.4, 7} | 10.50.60.21 |
| {10.120.85.10, 10.50.60.4, 5} | 10.50.60.22 |
| {10.120.85.10, 10.50.60.4, 4} | 10.50.60.21 |

Creating and Managing DIT Tables

Figure 14:
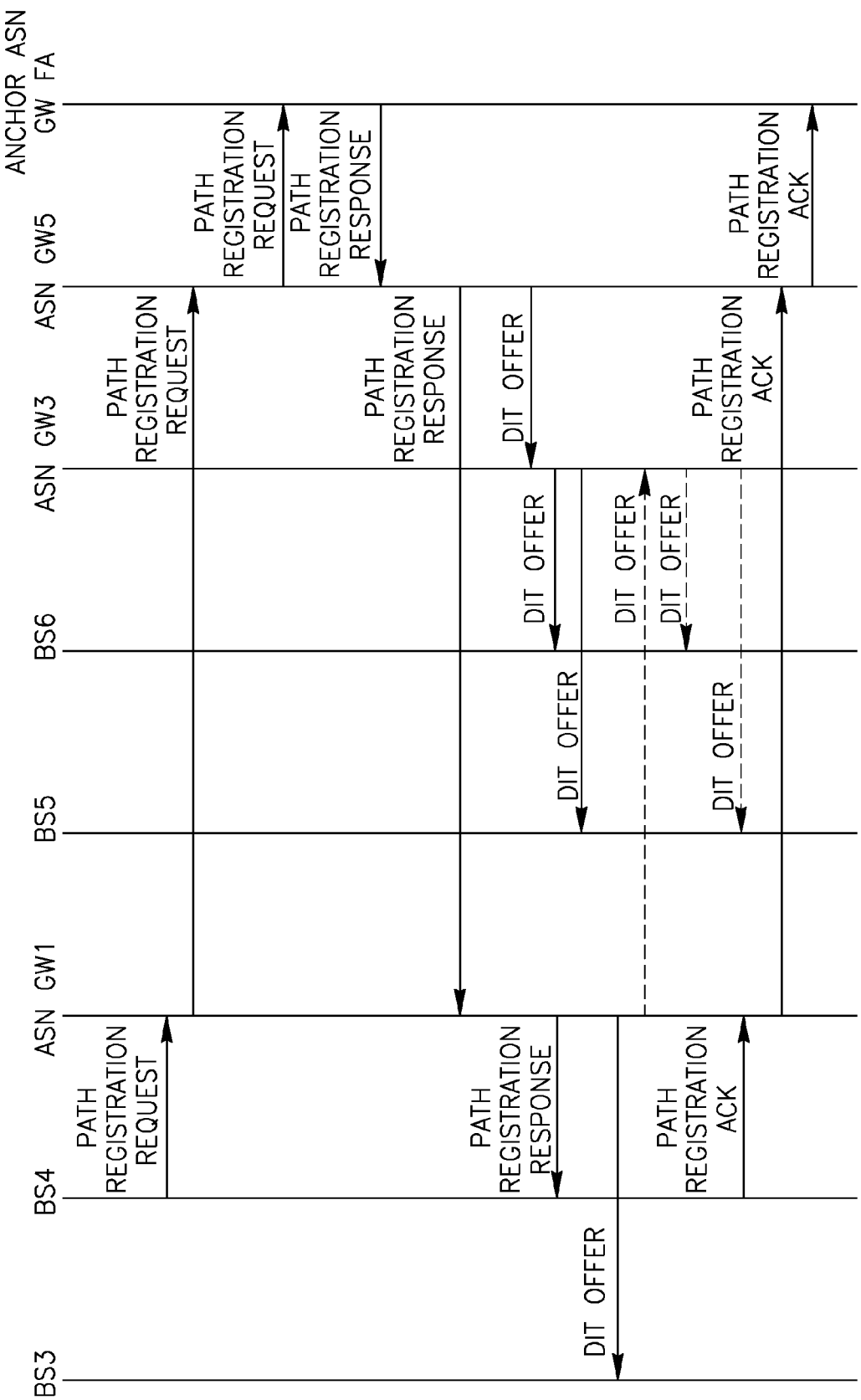
FIG. 14 illustrates an example of a process of DIT table offering for the network topology shown in FIG. 13.

Creating and managing DIT Tables is modeled after creating and managing IP Multicast Routing Tables. FIG. 14 illustrates the process of creating DIT Tables for the topology shown in FIG. 13. As shown in FIG. 14, BS4 sends Path Registration Request to the Anchor GW/FA via ASN GW1 and ASN GW5. BS4 also incorporates the list of its neighbor BS IP Addresses (e.g. the IP Addresses of BS3, BS5 and BS6) into the request. This comprises the DIT Tree join on behalf of the neighbor BSs.

Depending on policy adopted in the network, each or some of the intermediate anchor points along the path may offer their DIT Tables to the lower hierarchy anchor points and the associated BSs (the possible policies are considered hereinafter). Offering DIT Tables is done via sending DIT Offer (a new proposed primitive) to the lower hierarchy anchor point listed in the DPA Table. The offering entity should select the same lower hierarchy anchor point for the same DIT Group identified {e.g. by sending Anchor GW/FA IP Address, Serving BS IP Address, MSID Hash}.

By the process illustrated in FIG. 14, ASN GW5 sends DIT offer to ASN GW3. The message contains IDs of the BS5 and BS6 as well as the offered DIT Table. The ASN GW3 terminates the offer, calculates the DIT Table for the BS5 and BS6 and sends separate DIT Offers to them. Similarly, mutates mutandis, ASN GW1 sends DIT offer to BS3.

Furthermore, by yet another embodiment of the invention, a soft state of the DIT Tables is maintained so that each entry exists for a predefined time interval. The DIT offers are resent periodically at a time interval less than the aging time of the DIT Tables. If a DIT offer is not sent, the corresponding entry in the DIT Table is aged out.

In addition to the above, any of the following policies could be implemented:
1. Lower Hierarchy Offers First: The intermediate anchor point that receives the Path Registration Request examines the list of the Neighbor BSs included in the request, selects the BSs to which it will offer the DIT Tables and removes them form the list. The next anchor point does the same with the reduced set of Neighbor BSs. Eventually the set may become empty at a certain intermediate anchor point.
2. Higher Hierarchy Offers First: The set of the Neighbor BSs propagates uplink Path Registration request to the Anchor ASN GW/FA. Then the Anchor ASN GW/FA examines the list of the Neighbor BSs included in the request, selects the BSs to which it will offer DIT Tables and removes them form the list. The reduced set is then sent downlink with Path Registration Response to the next intermediate anchor point that repeats the operation.
3. All Hierarchies Offer: None of the entities along the data path removes Neighbor BS IP Addresses from the list. Each anchor point may (but not necessarily does) offer DIT Tables accompanied with TE metrics or other parameters that express cost associated with selecting the offered DIT Table. The lower hierarchy anchor points and the BSs select DIT Table with the minimum associated cost. This option is illustrated in FIG. 14.

In general, it is preferred that only the anchor points that have full topology and traffic engineering knowledge on the path downward the neighbor Base Stations should send the DIT Offers.

It should be noted that although the DIT Tables are populated for as long as MS resides in a certain Base Station, the actual traffic multicasting happens only during HO (or FBSS, MDHO) and only for selected Service Flows.

Data Path Segmentation

The ASN GWs that are used as Anchor GW/FA and intermediate anchor points may have different capabilities when it comes to classification and data integrity support. For example some GWs may support multicasting and/or buffering to be used for data integrity operations, while others do not. Some classify packets per Service Flow while others per MS.

When data paths are created, the following set of conditions should preferably be met:
1. At least one anchor point along the path supports both data integrity and classification per Service Flow.
2. If an anchor point supports both data integrity and classification per Service Flow, all anchor points downward (i.e. located between this anchor point and the Serving BS) must also support both data integrity and classification per Service Flow.

Preferably, the capabilities related to classification and data integrity support are communicated and stored per each anchor point listed in the DPA Tables.

Nevertheless, each intermediate anchor point should preferably add its capabilities to the Path Registration Request and the Path Registration Response. Thus, the Path Registration Request and Response deliver to the final destination and intermediate anchor points the ID of the first entity following which (downwardly) the data path supports both data integrity and classification per Service Flow. The ID of this entity is communicated between the Base Stations during handover and Data Integrity Tree is rooted at this entity. During Data Integrity Tree building operations this entity should not propagate the neighbor BS list upward (i.e. to the ASN GWs that do not support the required capabilities).

It is to be understood that the above description only includes some embodiments of the invention and serves for its illustration. Numerous other ways of building the hierarchical data paths may be devised by a person skilled in the art without departing from the scope of the invention, and are thus encompassed by the present invention.

The invention claimed is:

1. A method for communicating between a mobile station (MS) and a home agent (HA) in a wireless network that includes a first base station in a first subnet and a second base station in a second subnet, the first subnet being connected with the second subnet via a communication link, said method comprising:
    exchanging traffic between the MS and the HA along a first path, the first path being established via the first base station and a network entity operating as an anchor point in the first subnet;
    selecting at the second base station an intermediate anchor point for providing path information for access to the MS when the MS moves from the first subnet to the second subnet;
    establishing a second path for conveying traffic between said MS and said HA, said second path being established via said second base station, said intermediate anchor point, the communication link, and the network entity operating as an anchor point in the first subnet; and distributing topology and capacity related information to one or more network entities located in the second subnet enabled with routing capabilities.

2. A method according to claim 1, wherein the first subnet and the second subnet operate at rates that are higher than the rate of the communication link connecting the first subnet and the second subnet.

3. A method according to claim 1, wherein the intermediate anchor point is selected using a traffic path anchoring table maintained at the second base station.

4. A wireless system, comprising:
a first base station in a first subsystem;
a second base station in a second subsystem;
a communication link between the first subsystem and the second subsystem; and
a mobile station configured to communicate with a home agent by exchanging traffic along a first path, the first path being established via the first base station and a network entity operating as an anchor point in the first subsystem, and when the mobile station moves from the first subsystem to the second subsystem, exchanging traffic along a second path, the second path being established via the second base station, an intermediate anchor point, the communication link, and the network entity operating as an anchor point in the first subsystem,
wherein the intermediate anchor point is selected by the second base station to provide path information for access to the mobile station, and
wherein the network entity operating as an anchor point in the first subsystem is configured to distribute topology related information and capacity information to one or more network entities located in the second subsystem that have routing capabilities.

5. A system according to claim 4, wherein the second base station includes a traffic path anchoring table to be used in selecting the intermediate anchor point.

6. The method of claim 1, wherein establishing the second path comprises the intermediate anchor point sending a path registration request to the network entity operating as an anchor point in the first subnet.

7. The method of claim 1, further comprising updating said second path to remove the network entity operating as an anchor point in the first subnet.

8. The method of claim 6, wherein updating said second path comprises the network entity operating as an anchor point in the first subnet sending a path redirect notification to the second base station, the path redirect notification signaling a desired path change.

9. The method of claim 6, wherein updating said second path comprises the intermediate anchor point sending a path registration request to the network entity operating as an anchor point in the first subnet.

10. A method as claimed in claim 3, wherein the traffic path anchoring table comprises IP addresses of network routers and gateways eligible to be used as the intermediate anchoring point.

11. A method according to claim 1, further comprising distributing traffic engineering metrics to network entities enabled with routing capabilities located in said wireless network.

12. A method as claimed in claim 11, wherein distribution of traffic engineering metrics is performed using standard routing protocols.

13. A method as claimed in claim 11, wherein distribution of traffic engineering metrics to gateways in the network that are not enabled with routing capabilities is performed using a modified interior gateway protocol equipped with additional learning abilities.

14. A method as claimed in claim 1, wherein the network entity operating as an anchor point in the first subnet is a router, a gateway, or a base station that has routing capabilities.

15. A method as claimed in claim 1, wherein the intermediate anchor point is a router, a gateway, or a base station that has routing capabilities.

16. A system according to claim 4, wherein the first subsystem and the second subsystem operate at rates higher than the rate of the communication link between the first subsystem and the second subsystem.

* * * * *